United States Patent [19]
Laune

[11] 3,881,739
[45] May 6, 1975

[54] CHILD'S COLLAPSIBLE STROLLER
[75] Inventor: Pierre Laune, Attiches, France
[73] Assignee: Unilando, Attiches, France
[22] Filed: Aug. 13, 1973
[21] Appl. No.: 387,656

[30] Foreign Application Priority Data
Jan. 12, 1973   France .............................. 73.01008

[52] U.S. Cl. ................................................ 280/42
[51] Int. Cl. .............................................. B62b 7/08
[58] Field of Search ........ 280/36 R, 36 B, 41 B, 42, 280/62

[56] References Cited
UNITED STATES PATENTS
| | | | |
|---|---|---|---|
| 649,300 | 5/1900 | Hall et al. | 280/42 |
| 1,560,802 | 11/1925 | Julstedt | 280/42 |
| 2,471,462 | 5/1949 | Toth | 280/36 R |
| 2,754,889 | 7/1956 | Lovelace | 280/36 R |
| D157,085 | 1/1950 | Pinkerton | 280/36 R |

Primary Examiner—M. Henson Wood, Jr.
Assistant Examiner—Robert Saifer

[57] ABSTRACT

A child's stroller comprises a pair of horizontal side elements pivoted to each other at one of their ends and supported on three wheels, one of which is located at the pivot point, the other two wheels being at the other ends of the side elements; each of the side elements supporting an upright member by means of an articulated connection so that the side elements and upright members can be folded together and the upright members collapsed upon the side elements to reduce the space occupied by the stroller for travelling and storage.

7 Claims, 10 Drawing Figures

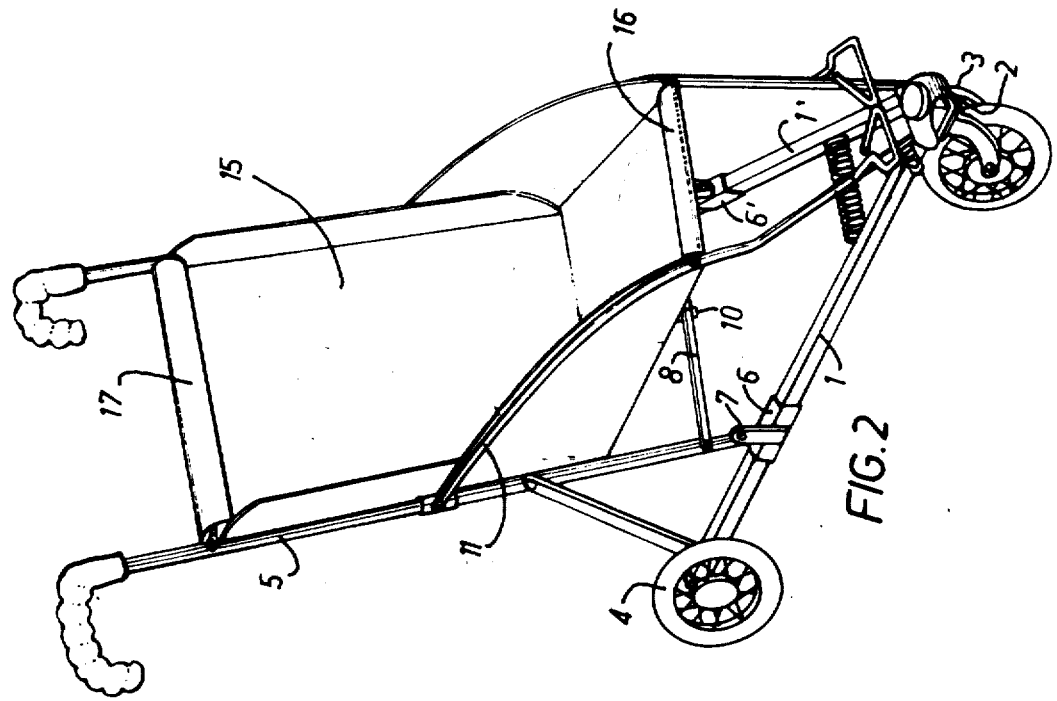
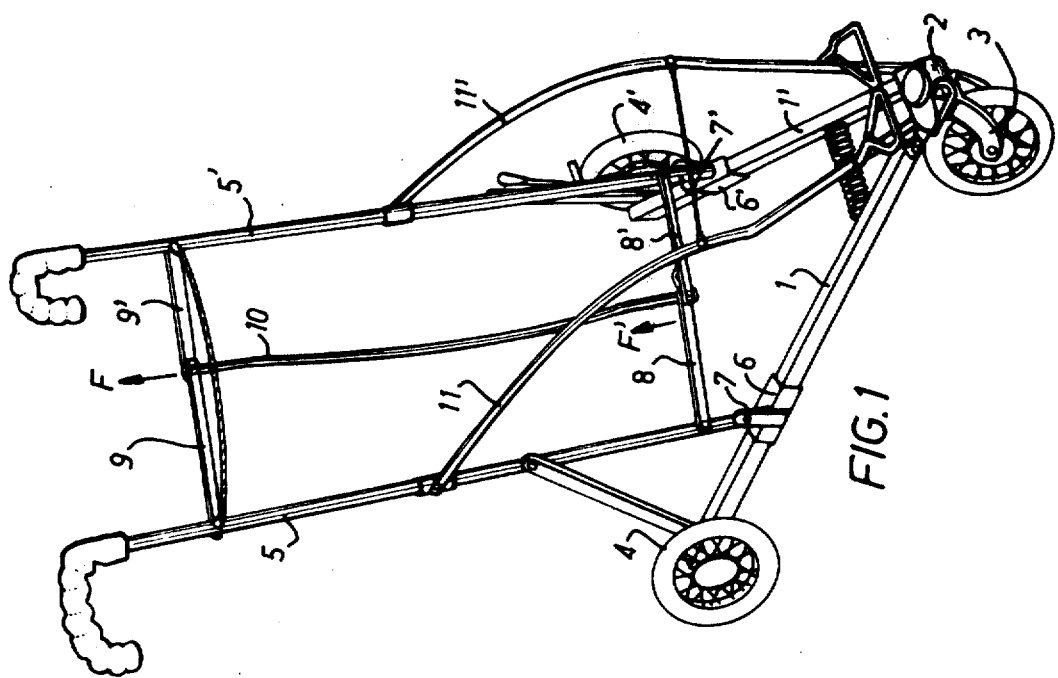

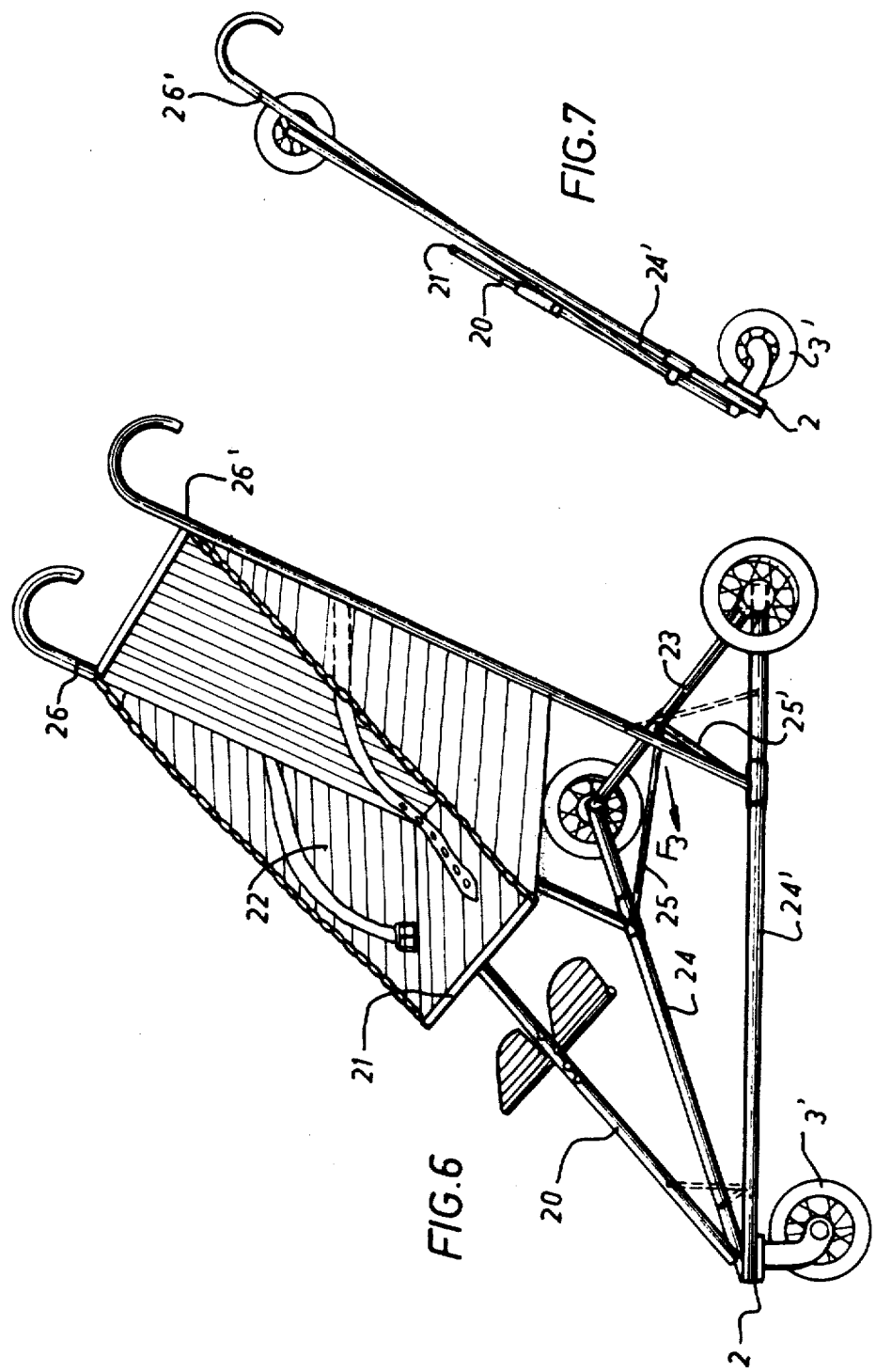

CHILD'S COLLAPSIBLE STROLLER

The present invention relates to a novel foldable stroller for young children or babies.

Various types of strollers are known for carrying a baby or young child sitting on a seat made of supple material and resting on a frame structure formed of generally metallic elements that may be folded to occupy a minimum of space.

In fact, it is desirable, particularly for young couples, to be able to transport a push-chair or the like for taking a young child or baby for a walk; conventional strollers are generally cumbersome and raise problems when they have to be transported, for example in a car.

For this reason, it is desired to have a stroller taking up a minimum of space and made of elements which are foldable in such a way as to occupy, in folded position, only a very small area.

However, heretofore manufactured foldable strollers are not satisfactory; they are generally divided between two contradictory imperatives: either they take up a minimum space when folded, but are uncomfortable to sit in, or they are comfortable for the child, but, when folded, take up a considerable space which is often prohibitive.

It is also important to avoid designs which are too complex, thus rendering production expensive.

It is precisely an aim of the invention to produce a foldable stroller which unites the various imperatives; in particular, the foldable stroller according to the invention may occupy an extremely small space by its various elements being folded; its design is extremely simple, this leading to an inexpensive production; finally, it is comfortable for the child and easily handled by the person pushing it.

To this end, the invention relates to a child's stroller, of the type constituted by a seat support formed of a supple material resting on a frame formed of foldable elements, said stroller comprising a lower chassis forming a pair of compasses and constituted of two side elements articulated on a common base supporting a front driving wheel, the side members comprising at their end opposite said articulation a bearing wheel, all the chassis resting on the front wheel and on the bearing wheels, the two articulated side members being connected together by an element forming a foldable cross-piece, itself articulated in two parts, this element being capable, in its position of extension, to form a cross-piece, of which the two halves are substantially in line with one another.

Under these circumstances, all the stroller rests on a triangular chassis whose two side elements are articulated at their apex and may be folded together, the cross-piece located preferably at the base then being folded on itself; when the two side members are spaced apart, the cross-piece is brought into extended or linear position, the two elements being in line with one another and ensuring their function of locking the two side members in position.

Each of the side members preferably supports a vertical upright, itself articulated to the corresponding side member.

The cross-piece ensuring the locking of the side members in position and for folding same is preferably located at the base of the vertical uprights.

According to a preferred embodiment of the invention, the two vertical uprights are associated with two upper and lower cross-pieces, which are formed of two equal bars articulated together and pivoted by their ends on each of the uprights.

The two cross-pieces may be mechanically connected together by means of a small rod connecting their central articulation.

According to this latter embodiment of the invention, the folding movement imposed by a pressure exerted by the operator on one of the cross-piece elements is automatically transmitted to the other element by means of the connecting rod; this folding movement of the cross-pieces causes the vertical uprights to move together and consequently the compass-forming side members articulated at their apex.

According to yet another characteristic of the invention, the vertical uprights are mounted to slide by their base on each side member.

To this end, the lower end of each upright is articulated on a sleeve taking the form of the corresponding side-member and slidable along this side member.

According to yet another characteristic of the invention, the stroller laterally comprises two arms articulated on one side to the support plate of the front wheel forming the head of the compasses constituting the lower chassis, the opposite end of each arm being articulated substantially at the center of each vertical upright.

The folding movement of the stroller is therefore effected in two stages.

The compasses formed by the two side members articulated to the support head of the front driving wheel closes on itself; to this end, a pressure is exerted on the cross-pieces articulated and connected together by a small rod and these cross-pieces close; at the same time, the side members forming the triangular chassis of the stroller are brought together until they are substantially side by side; at the end of this first stage, the two symetrical halves of the stroller which were until now spaced from one another are returned to substantially juxtaposed position; in a second stage, the vertical uprights of the stroller are returned to a position substantially parallel to that of the side members; to this end, their base mounted on a sliding sleeve is pushed back towards the front of the stroller corresponding to the support plate of the front wheel head; the upper end of the vertical uprights is then returned rearwardly and at the end of this movement, these vertical uprights occupy a position which is substantially adjacent and parallel to that of the side members forming the lower chassis.

The vertical uprights will in practice be slightly inclined, for reasons of convenience and aesthetics, with respect to the vertical.

The support or child's seat is itself constituted of a hammock in the form of a seat made of supple material, this support being removably mounted on two small cords or straps made of supple material, disposed on the one hand at the upper end of the vertical uprights and on the other hand substantially at the center of the side arms connecting said vertical uprights to the central plate supporting the front wheel.

Foot rests may be disposed at the lower end of the side arms substantially in the vicinity of the plate supporting the front wheel.

A return spring may be positioned between the two side members and facilitate the elastic folding movement of the side members against one another.

The upper end of the vertical uprights will preferably be provided with handles for manually controlling and steering the stroller.

According to a variant embodiment, the front plate forming the head of the compasses constituted by the chassis and supporting the front wheel, is associated with a central rod articulated to said plate and capable, in extended position, of supporting, by its end, the base of the seat, and in addition receiving foot rests which are adjustable in position, the inclined rod being locked in extended position by a cross-piece resting on the side members.

The stroller forming the object of the invention may be applied to all types of uses; a shopping basket could also be made, having the same characteristics according to another variant embodiment, the hammock forming the child's seat comprises elements made of supple material that may be folded against the walls forming the child's seat and unfolded to form a bag for carrying shopping or the like.

The invention will be more readily understood upon reading the following description with reference to the accompanying drawings in which:

FIG. 1 is a view of the chassis of a stroller according to a first embodiment of the invention, this chassis being in unfolded position, without the seat.

FIG. 2 shows a view of the stroller shown in FIG. 1, but provided with the hammock constituting the child's seat.

FIGS. 6 and 7 shows a view of a variant embodiment.

Figure 3:
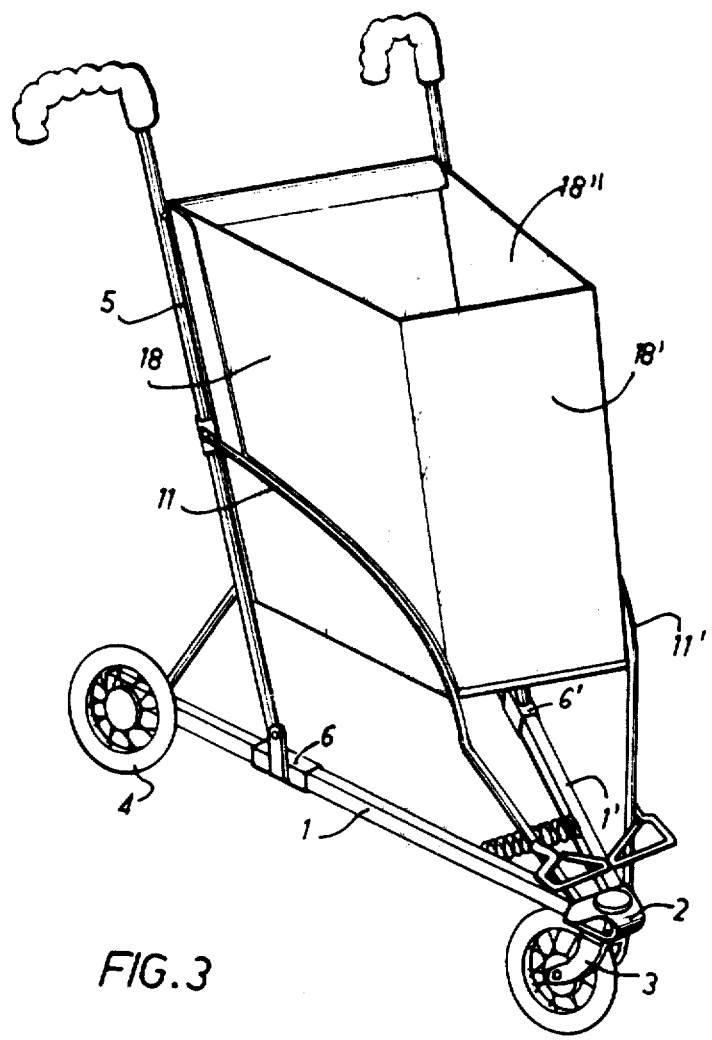
FIG. 3 shows a variant embodiment in which the hammock shown in FIG. 2 is unfolded to constitute a shopping basket resting on the push-chair.

Referring now to FIGS. 1 to 5, the stroller is essentially constituted of a lower chassis constituted of two side members 1 and 1'; these latter are articulated on a common head 2 bearing a front driving wheel 3. The two side members 1 and 1' thus form a pair of compasses and at their end opposite head 2, they each support a wheel 4,4', the assembly thus constituting a three-wheel support.

On the side members 1 and 1' there rest the uprights 5,5' disposed in slightly inclined position with respect to the vertical; each upright rests on a base formed of a sleeve 6 and 6' on which it is articulated by a pivotal axis 7 and 7'; the sleeves 6 and 6' may slide freely along the corresponding side member 1,1'; the uprights 5 and 5' are maintained in spaced relationship by cross-pieces, viz: a lower cross-piece formed of two elements 8 and 8' and an upper cross-piece formed of two elements 9 and 9'; these two cross-pieces composed of two articulated parts may be folded by following a movement represented by arrows F and F' and bringing the two uprights 5 and 5' against each other and consequently the two side members 1 and 1'.

In extended position, the two elements 8 and 8' forming the lower cross-piece and the elements 9 and 9' forming the upper cross-piece are brought substantially in the axis of each other and they then ensure that the two symmetrical halves of the stroller are locked in position of extension.

An intermediate rod 10 ensures the connection of lower cross-pieces 8,8' and upper cross-pieces 9,9'; under these circumstances, a movement or a pressure applied to the centre of the lower cross-piece in the direction of arrow F', for example with the foot, causes by the rod 10, a similar lifting movement of the upper cross-piece and thus ensures their coupling and synchronised movement.

Figure 4:
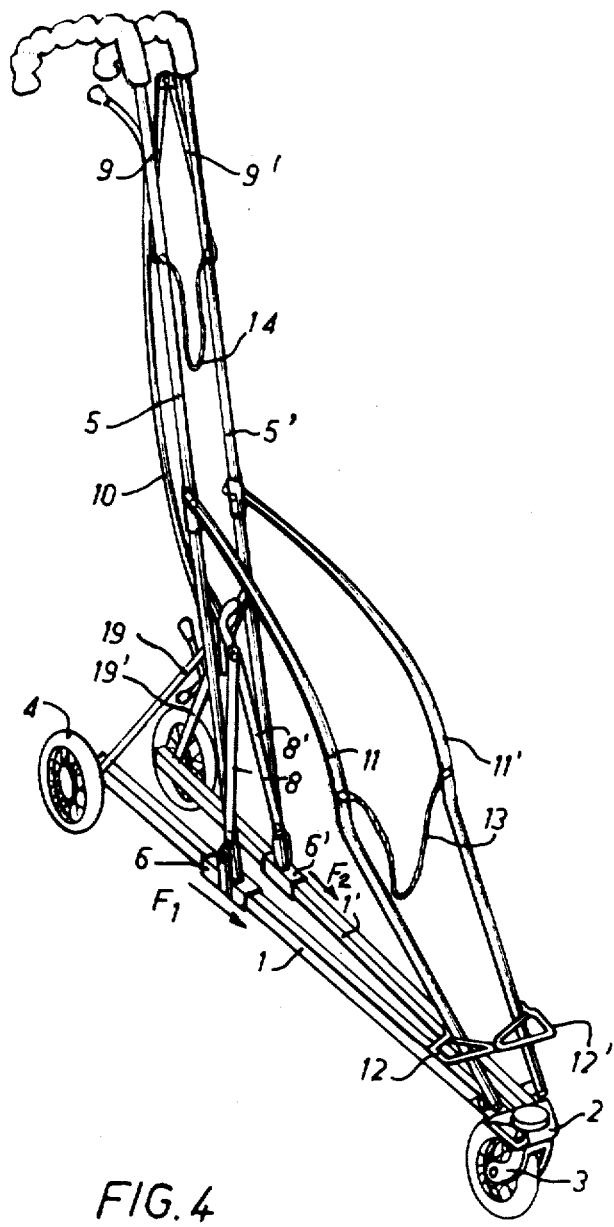
FIG. 4 shows a view of the frame of the push-chair according to FIG. 1 but in folded position by angularly bringing together the two lateral halves of the stroller.

It is therefore easy, by this movement, to bring the chassis into the position shown in FIG. 4 and in which the side members and uprights are folded against one another.

Side arms 11 and 11' are articulated by their front end to the plate 2 whilst their rear end is articulated substantially at the centre of the uprights 5 and 5'.

At their front end, the arms 11,11' support foot rests 12,12' for the child's feet; small cords or supple straps 13 and 14 allow the positioning of a hammock forming a seat, being shown in unfolded position in FIG. 2; this hammock 15 comprises folded parts 16 at its lower end and 17 at its upper end which enclose the small cords or straps 13 and 14 and thus ensure the positioning of the hammock within the support frame.

In the variant embodiment shown in FIG. 3, the hammock may comprise walls 18,18', 18" which may be folded to enable the hammock to be used as a seat for transporting the child, whilst in unfolded position as shown in FIG. 3, these walls may form a bag for carrying shopping.

Figure 5:
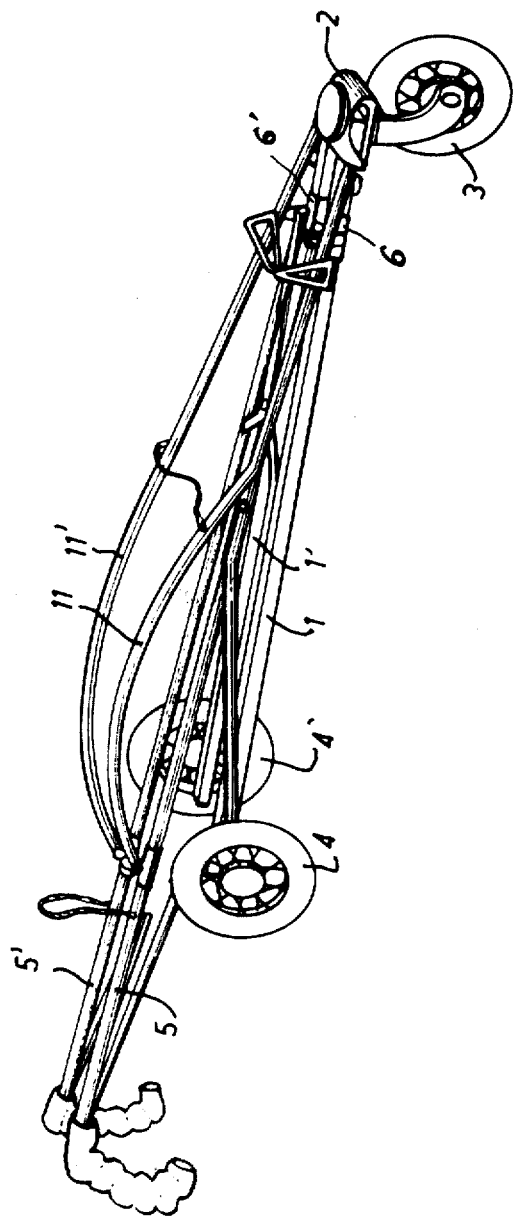
FIG. 5 shows the push-chair of FIGS. 1 and 4 after the vertical uprights have been folded against the side members.

FIG. 4 shows a view of the stroller partially folded up; to this end, after the two lateral halves formed by the side members 1 and 1' and the uprights 5,5' have been brought together by a movement about the articulation constituted by the head plate 2, the uprights 5,5' are returned into a position substantially parallel to that of the side members by sliding the lower sleeves 6 and 6' in direction of arrows F 1 and F 2; in this movement, the side arms 11 and 11' are also returned into position substantially parallel with respect to the side members 1 and 1'; the rear reinforcing ribs 19 and 19' are also positioned so that they follow the movement and are returned into the position shown in FIG. 5.

This Figure shows that all the parts forming the frame of the stroller occupy substantially parallel positions and form a bundle of extremely reduced dimensions.

However, the movement for bringing this assembly from unfolded to folded position and vice versa is extremely simple since only two successive movements are required; a first angular movement bringing the two side halves of the stroller together and a sliding movement of the base of the uprights returning these latter into position parallel with respect to the side members.

FIGS. 6 and 7 show a simplified form of a variant embodiment having the same characteristics. However, in this variant, an inclined central element 20 rises from the head plate 2' to support a transverse bar 21 on which rests the front base of the supple seat 22; the base of the axial element 20 is articulated on the head plate 2' supporting the front driving wheel 3'; the rear cross-piece 23 connects the end of the side members 24,24' and it is by a front movement in the direction of arrow F 3 that the cross-piece 23 articulated in two parts folds on itself, causing the two side members 24,24' to come together. The rods 25,25' formed of supple cords limit the rearward clearance of the crosspiece 23.

The uprights 26,26' then slide by their base on the side members 24,24' to bring all the stroller into the position shown in FIG. 7 and in which the various elements are in substantially parallel relationship.

Figure 8:
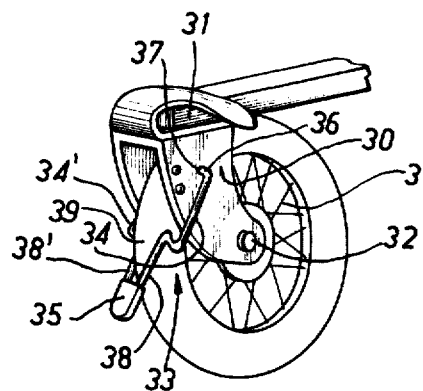
FIGS. 8, 9 and 10 show a device for immobilizing and locking the front wheel.
Figure 9:
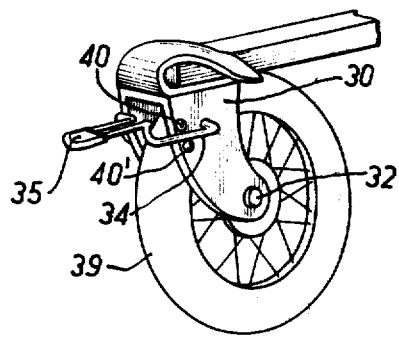
Figure 10:
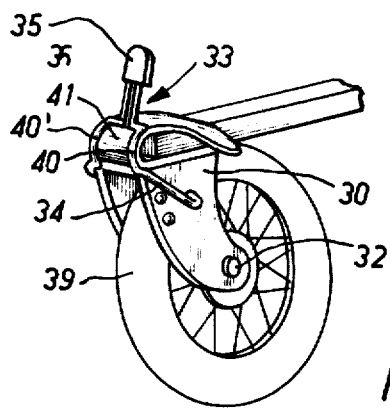

FIGS. 8, 9 and 10 show a device for immobilising and locking the front wheel.

The front wheel 3 is mounted to rotate in a fork-member 30, itself mounted on a pivot 31 integral with a front part of the frame; the axis of rotation 32 is offset with respect to the axis of the pivot 31.

A locking and braking device is mounted on the fork-member 30. This device is essentially constituted by a clip 33 formed by two arms 34 and 34' of curved wire. At one end, the arms are connected on a common manoeuvring and prehension element 35; at the opposite end, 36, each arm 34,34' is mounted to rotate about an axis; for example, the arms are curved and the bent part 36 penetrates into a housing 37 provided therefor; thus the clip 33 may be displaced angularly about the articulation constituted by the end of these arms 36 pivotted in the housing 37.

This clip may successively occupy each of the positions shown in FIGS. 8, 9 and 10.

In FIG. 8, the locking member formed by the clip 33 is brought into low position; in this position, the ends 38,38' of the arms 34,34' encompass the tyre 39 of the wheel 3 and the clip, thus immobilising said tyre. In this position, the clip 33 acts as a brake and ensures that the stroller stays in place.

In the position shown in FIG. 9, the arms of the clip are immobilised in rest position between the two projections 40,40' disposed on each part of the fork member 30; in this position, the clip is inactive and allows the wheel to turn freely.

In the position shown in FIG. 10, the clip is completely lifted and the bent part 41,41' of each of the arms is locked on the front face 41 of complementary section, integral with the frame; under these circumstances, the clip 33 is locked on the front part 41 integral with the frame and the clip 33 maintains the fork-member 30 in a definite position with respect to the frame; this position preferably corresponds to the positioning of the wheel 3 in the axis of the stroller and it is then possible to use the stroller, but preventive the free movement of the wheel 3 about its pivot 31, the wheel 3 no longer being driving, but being locked so as to ensure the advance movement of the stroller along a substantially constant axis.

What I claim is:

1. A child's stroller of the type comprising a frame formed of foldable elements, a support seat made of supple material resting on said frame and a plurality of bearing wheels mounted on said frame, wherein said frame is constituted by
    a median support plate,
    rolling means mounted on said support plate
    two side elements articulated on said support plate, said side elements thus forming a pair of compasses
    two lateral bearing wheels, each mounted on one end of each of said side elements opposite said support plate
    a foldable connecting means adapted, when put in active position, to cause said side elements to form a triangular chassis resting on said rolling means and two wheels
    two lateral uprights, each resting on one side element and being articulated on the respective side element
    two side arms articulated at one end of the median support plate, the opposite end of each side arm being articulated substantially at the center of a respective upright.

2. A stroller as claimed in claim 1 wherein said connecting means are formed of two upper and lower cross-pieces, each cross-piece being formed of two substantially equal bars articulated together and pivoted by their end on each of the uprights and thus foldable one against the other.

3. A stroller as claimed in claim 2, wherein in addition the two cross-pieces are mechanically connected together by means of a vertical rod connecting their central articulation.

4. A stroller as claimed in claim 2, wherein in addition the uprights are mounted to slide by their base on each side member.

5. A stroller as claimed in claim 4 further comprising two slidable sleeves, each of them is slidabily mounted on one side member, the lower end of each upright being articulated to the corresponding sleeve.

6. A stroller as claimed in claim 1 wherein in said support seat is a hammock and has two support means made of supple material connected on the one hand at the upper end of the uprights and on the other hand substantially at the center of said side arms, the hammock resting on said support means.

7. A stroller as claimed in claim 1, further comprising two foot rests arranged at the lower end of the side elements substantially in the vicinity of the support plate.

* * * * *